March 5, 1929. W. P. HUNT 1,704,130
AUTOMATIC CONTROL FOR LAPPING MACHINES
Filed Sept. 30, 1926 8 Sheets-Sheet 2

FIG. 2

INVENTOR.
Wilson P. Hunt.
BY Walter N. Haskell,
his ATTORNEY.

March 5, 1929.  W. P. HUNT  1,704,130
AUTOMATIC CONTROL FOR LAPPING MACHINES
Filed Sept. 30, 1926   8 Sheets-Sheet 3

INVENTOR.
Wilson P. Hunt,
BY Walter N. Haskell,
his ATTORNEY.

March 5, 1929.  W. P. HUNT  1,704,130

AUTOMATIC CONTROL FOR LAPPING MACHINES

Filed Sept. 30, 1926   8 Sheets-Sheet 5

INVENTOR.
Wilson P. Hunt.
BY Walter N. Haskell.
his ATTORNEY.

March 5, 1929.  W. P. HUNT  1,704,130
AUTOMATIC CONTROL FOR LAPPING MACHINES
Filed Sept. 30, 1926  8 Sheets-Sheet 7

March 5, 1929.   W. P. HUNT   1,704,130
AUTOMATIC CONTROL FOR LAPPING MACHINES
Filed Sept. 30, 1926   8 Sheets-Sheet 8

INVENTOR.
Wilson P. Hunt,
BY Walter N. Haskell.
his ATTORNEY.

Patented Mar. 5, 1929.

1,704,130

UNITED STATES PATENT OFFICE.

WILSON P. HUNT, OF MOLINE, ILLINOIS.

AUTOMATIC CONTROL FOR LAPPING MACHINES.

Application filed September 30, 1926. Serial No. 138,716.

My invention has reference to an automatic control for lapping machines, of the type which is set forth in my former application for Letters Patent of the United States filed Sept. 12, 1925, Serial No. 56,015. Machines of this class usually carry a set of spindles, vertically arranged, and capable of a vertical movement as the work progresses. The spindles and lapping tools carried thereby are given a reciprocating movement whereby said tools are caused to operate on the inner walls of cylinders. In the machines as now constructed the reciprocation of said tools is continuous until interrupted manually, and frequently the operation is continued for a greater length of time than is necessary, involving a considerable waste of time. One of the purposes of the present invention is to limit the number of reciprocations to those ordinarily required for accomplishing the work.

Another feature thereof consists of a novel mechanism for giving an additional movement to the spindles at the end of their last upward stroke, to carry the lapping tools to a point well above the work, so that they will not interfere with the removal thereof, or the placing of new work in position.

The above mentioned, and other features and advantages of the invention will be more fully apprehended from the following specification, reference being had to the accompanying drawings, in which;

The reference number 1 indicates the base of the machine, supported upon the forward part of which is a table 2, upon which are held the cylinders or other work to be operated on. Mounted on the base is a frame 3, provided upon its front with a pair of vertical ways 4, upon which is slidable a traveller 5. Fixed to said traveller is a cross-beam 6, in which is journalled a shaft 7, on one end of which is a pulley 8. Supported by the cross-beam 6 is a housing 9, in which is rotatably mounted a plurality of spindles 10, each of which is fitted with a worm pinion 11 in mesh with a worm drive 12 on the shaft 7. On the lower ends of the spindles 10 are lapping tools 13 of a common character, for operation on the inner walls of cylinders supported on the table 2. Upon a rotary movement being imparted to the shaft 7 in the manner hereinafter set forth, such movement is imparted to the spindles 10 and tools 13.

Figure 7:
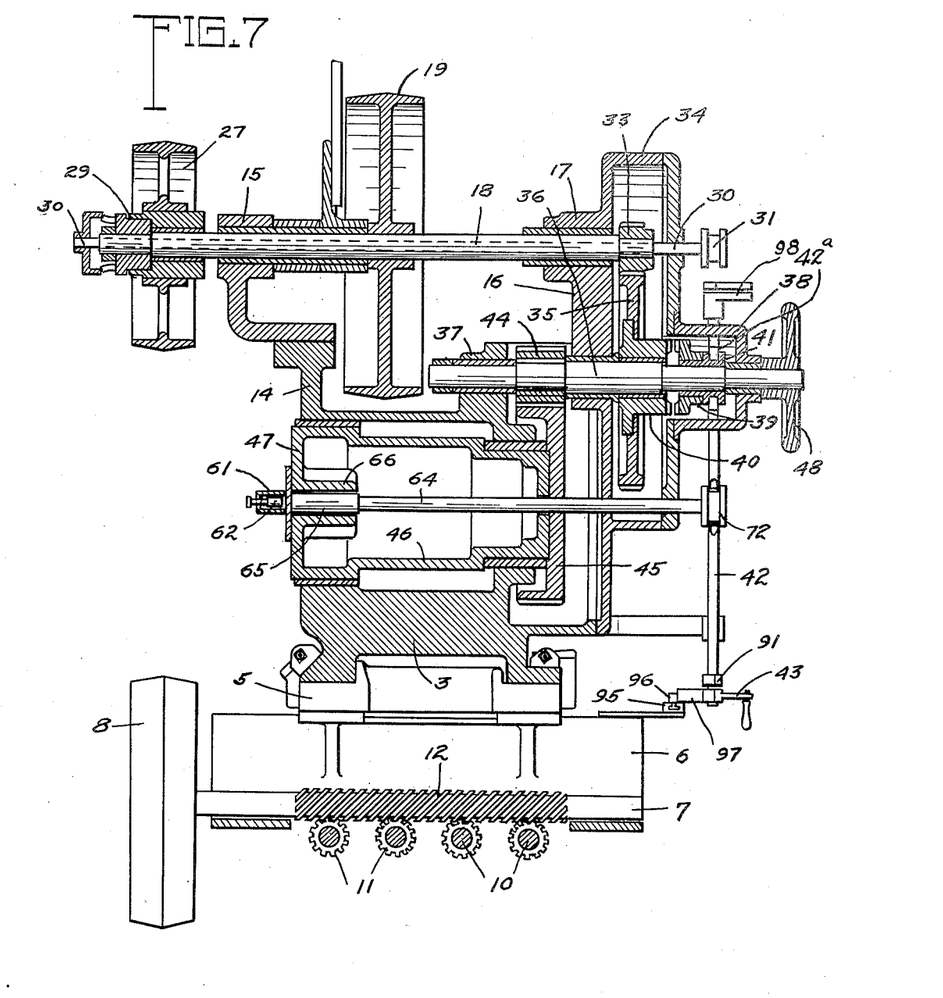
Fig. 7 is a horizontal section on the broken line 7—7 of Fig. 3.

On the rear part of the side-plate 14 of the frame is supported a bearing 15, and in line therewith in the rear part of the side-plate 16 of the frame is a similar bearing 17. Rotatably mounted in said bearings is a shaft 18, (Fig. 7) which is the main drive shaft of the machine, to which shaft is fixed a pulley 19, connected by a belt 20 with a pulley 21 on the shaft 22 of an electric motor 23, supported on the base 1. By this means movement may be imparted to the shaft 18, to continuously rotate the same. The belt is held in a taut condition by means of an idler pulley 24 on the end of an arm 25 supported from the shaft 18.

Figure 2:
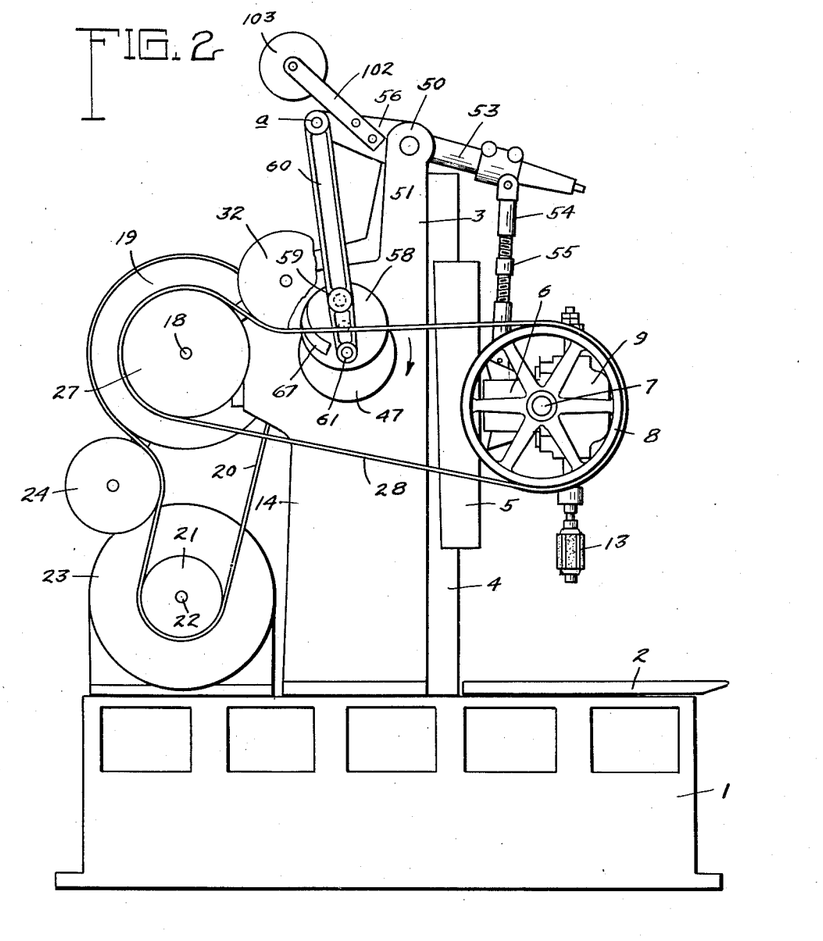
Fig. 2 is a similar view of the opposite side of the machine.

On one end of the shaft 18 is a pulley 27, connected by a belt 28 with the pulley 8. The pulley 27 rotates freely on the shaft 18, and is adapted to be operatively connected therewith by means of a clutch mechanism 29 on the end of the shaft, with which is connected a rod 30, extending through an opening lengthwise of the shaft 18, and provided at its opposite end with a recessed collar 31, for operation of said rod as hereinafter set forth. Supported above the belt 28 is an idler pulley 32, exerting a pressure thereon to assist in holding the same taut. (Fig. 2.)

On the end of the shaft 18 opposite to the clutch 29 is fixed thereto a gear pinion 33, within a housing 34, said pinion being in mesh with a gear wheel 35 on a shaft 36, journaled at one end in a bearing 37 on the frame, and at the other end in the end of an extension 38 of the housing. The wheel 35 rotates freely on the shaft 36, and is adapted for connection therewith by means of a clutch 39 on said shaft, slidable thereon and rotatable therewith. The teeth of said clutch are engageable with teeth on the end of the hub of the wheel 35, and said clutch is provided with a collar 41, engaged by a yoke 42$^a$ on rod 42, on the forward end of which rod is a lever 43, which will be more fully referred to hereafter.

On the inner end of the shaft 36 is fixed a gear pinion 44, in mesh with a gear wheel 45 secured to the inner end of a cylinder 46 rotatable in the frame of the machine, and provided at its outer end with a head 47, carrying mechanism hereinafter more fully set forth. Upon the movement of the shaft 18 being imparted to the shaft 36 by means of the clutch 39 the cylinder 46 will be rotated at a relatively low rate of speed. On the outer end of the shaft 36 is a hand-wheel 48, by means of which the position of the cylinder 46 may be shifted when the clutch 39 is not engaged.

Figure 3:
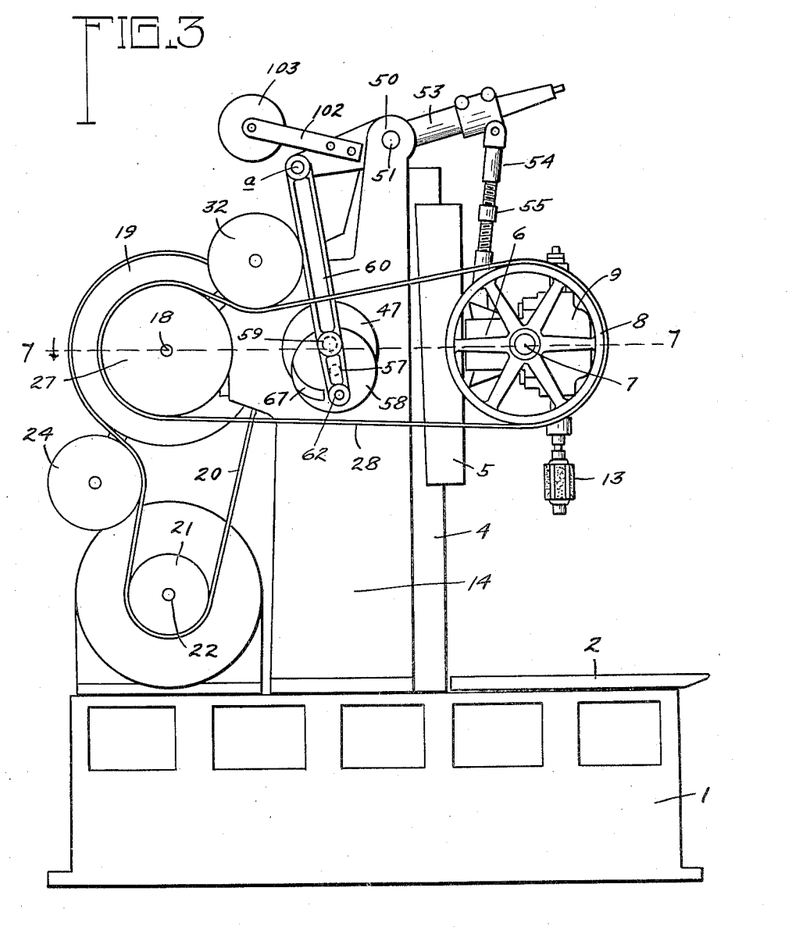
Fig. 3 is a view similar to Fig. 2, with the lapping tools at the upper end of their ordinary reciprocating movement.
Figures 8, 9, 10:
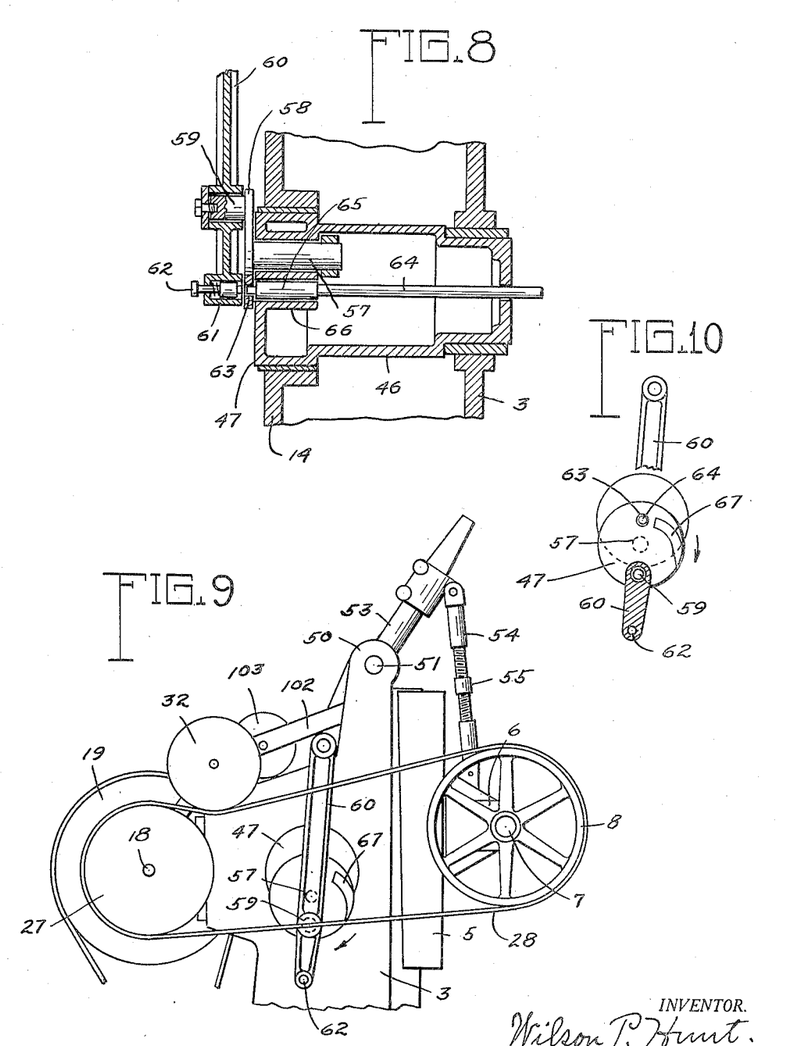
Fig. 8 is a vertical section of the barrel 46 and appurtenant parts.
Fig. 9 is a fragmentary end view of the machine, with the spindle mechanism in its highest operative position.
Fig. 10 is a diagrammatic view of the head 43 and disk 44, showing the ordinary movement of the disk and arm 60.

On the upper part of the frame is a pair of bearings 50, in which is journalled a shaft 51, to which is fixed a sleeve 52, from which projects forwardly an arm 53, connected with the cross-beam 6 of the spindle mechanism by means of a connecting rod 54, in which is an adjustment device 55 for lengthening or shortening such rod. Extending rearwardly from the sleeve 52 is a frame 56, which is operatively connected with the head of the cylinder 46 in the following manner. In the end of the head 47 is a pivot 57, to the end of which is fixed a disk 58, at one side of which is a pin 59, on which is pivoted an arm 60, the upper end of which has a pivotal connection with the frame 56, as at $a$. (Fig. 2.) At the lower end of the arm 60 is a small casing 61 in which is a spring-actuated pin 62, capable of entering an opening 63 in the disk 58, which opening is diametrically opposed to the pivot 59. When said pin is engaged with the opening 63 the disk 58 and arm 60 are connected at two points, and as a result the rotation of the head 47 will give a crank-pin movement to the arm 60, carrying the same from an extreme upper movement as shown in Figs. 2 and 8, to an extreme lower movement, as shown in Fig. 3. The first movement elevates the frame 56, giving to the cross-beam 6 and spindle mechanism a corresponding downward movement, while the downward movement of the arm 60 correspondingly depresses the end of the frame 56, and raises the spindle devices. This gives to the lapping tools a reciprocating movement coincident with the rotation thereof, which causes said tools to fully operate on all parts of the cylinder walls which are being finished thereby. The reciprocating mechanism is so controlled that a predetermined number of movements will be given to said tools, at the end of which the pin 62 will be dislodged from the opening 63 by the end of a rod 64, having an enlargement 65 slidable in a sleeve 66 in the head 47. The manner of operation of the rod 64 will be hereinafter more fully explained. As the pin 62 is dislodged the end of the rod 64 takes its place, locking the disk 58 and head 47 from independent movement. A continued rotation of said head then carries the disk and arm 60 downwardly into the position shown in Figs. 9 and 10. This gives a longer radius to the circuit of the pivot 59 and carries the frame 56 downwardly into a more inclined position as shown in said Fig. 9. This also elevates the spindle mechanism and lapping tools to a greater height, and leaves the work entirely free to be removed from the table 2 or replaced thereon. At the lowest point in the movement of the arm 60 the action of the machine is automatically interrupted. After the necessary changes in the positioning of the work have been made the machine is started again, whereupon the end of the rod 64 is withdrawn from the opening 63, permitting the pin 62 to again enter the same. This is not accomplished, however, until the head 47 has performed a half revolution, in the direction shown by the arrow in Fig. 9, also reversing the position of the disk 58. As the disk is turned the end of the pin 62 moves along an inclined channel 67 in the face of the disk, and is forced into the opening. The movement of the arm 60 is then continued.

By way of further illustration, it will be assumed that the cylinder 46 be given ten revolutions, the spindle devices being given a corresponding number of up and down movements. At the end of one of these movements, with the frame 56 elevated, the spindle devices lowered, and the disk 58 in the position shown in Figs. 2 and 8, the rod 64 is actuated, dislodging the pin 62 and permitting the arm 60 to be carried downwardly to its extreme limit, raising the lapping tools to a point well above the work. At the end of this movement the mechanism stops, the operation thereof to be resumed only after the necessary changes have been made in the work. Upon the machine being again set in motion the reciprocating movement in continued, another ten movements being imparted to the tools. This operation can be continued indefinitely, and the interruption of the movement of the machine is positive at the end of each cycle of operations, and not dependent upon the operator of the machine.

Figure 1:
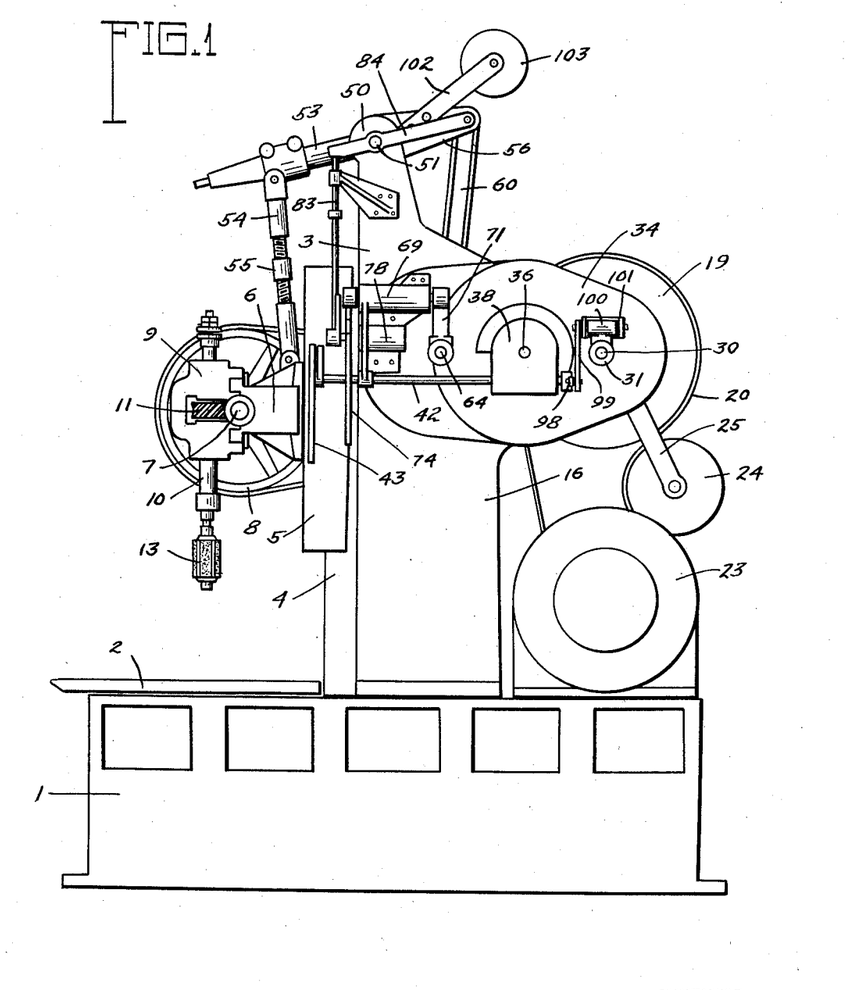
Fig. 1 is a side elevation of a machine embodying the invention, with the lapping tools at the lower end of their reciprocation.
Figure 12:
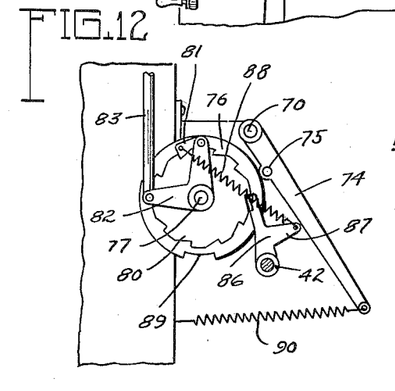
Fig. 12 is a front view detail of the ratchet wheel 80 parts in front thereof being omitted.

To the end of the frame of the machine opposite to the cylinder 46 is fixed a bracket 68, supporting a bearing 69, in which is held a rock-shaft 70. To the rear end of said shaft is secured a shift-arm 71, in engagement with a collar 72 on the end of the rod 64. The collar has a threaded engagement with said rod, so that the position of the collar can be adjusted longitudinally of the rod. Projected from the bracket 68 is an arm 73 which provides a support for the forward end of the rod 42. To the forward end of the shaft 70 is fixed a lever 74, provided with a boss 75 which rides upon the edge of a disk 76, rotatably mounted on a shaft 77, held in a bearing 78 on the bracket 68. Connected with the disk 76, so as to be rotatable therewith, is a ratchet-wheel 80, (Fig. 12) the teeth of which are engaged by a pawl 81 on one arm of a bell-crank lever 82. The other end of said lever is connected by a rod 83 with the front end of a rocker-arm 84, fulcrumed on the shaft 51, and connected at its rear end with the frame 56. (Fig. 1.) The movement of said frame is thus imparted to the lever 82, giving an oscillating movement thereto, and causing the pawl 81 to travel back and forth on the edge of the wheel 80, the length of movement thereof being equal to the space between two adjacent teeth of said wheel. Return movement of the wheel 80 is prevented by a dog 86, pivoted on the rod 42, said dog being provided with an arm 87, connected by a coiled spring 88 with the pawl 81, which spring serves to hold both the pawl and dog in contact with the ratchet-wheel.

In the edge of the disk 76 is a recess 89, into which the boss 75 drops upon each rotation of the disk. This permits the lever 74 to move inwardly, rocking the shaft 70 and arm 71, and forcing the rod 64 in a direction to cause the end thereof to enter the opening 63 in the disk 58, and dislodge the pin 59 therefrom. The movement of the lever 74 is made positive by means of a coiled spring 90, connecting the lower end of said lever with the frame of the machine. It will be observed that at the end of a given number of movements of the ratchet-wheel 80 the lever 74 will be actuated in the manner mentioned, and shortly following the same the movement of the machine is interrupted. Upon the machine being started again the boss 75 passes out of the recess 89, and the lever 74 is forced outwardly, withdrawing the end of the rod 64 from the opening in the disk 58, and permitting the pin 59 to reengage therein. The cycle of operations of the cylinder 46 is then repeated, in the manner and for the purpose hereinafter set forth.

Figure 4:
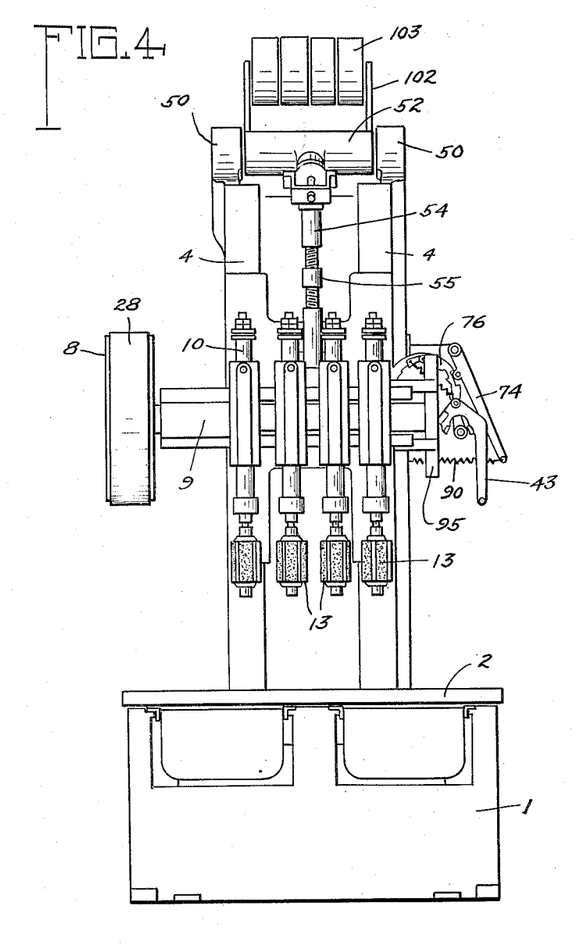
Fig. 4 shows the machine in front elevation.
Figure 5:
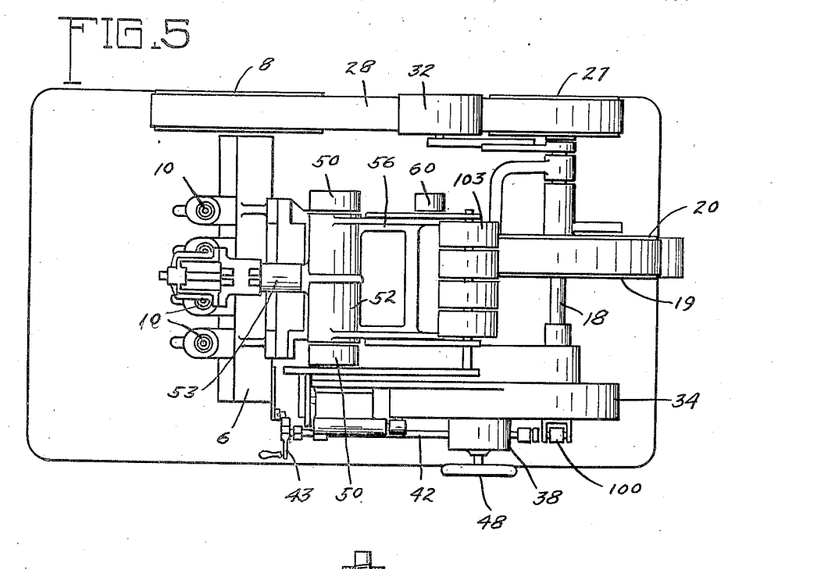
Fig. 5 is a plan view thereof.
Figure 6:
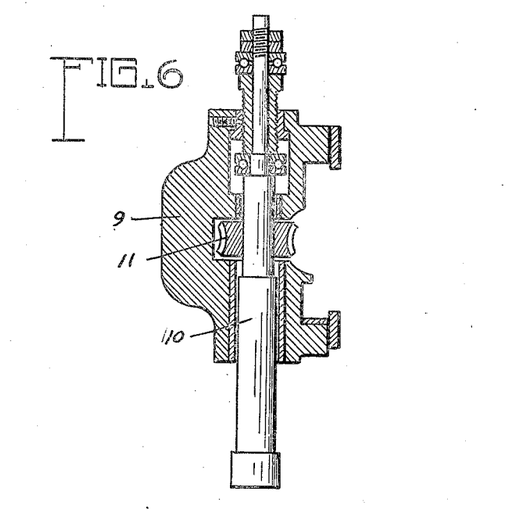
Fig. 6 is a vertical section through the housing of one of the spindles 9.
Figure 13:
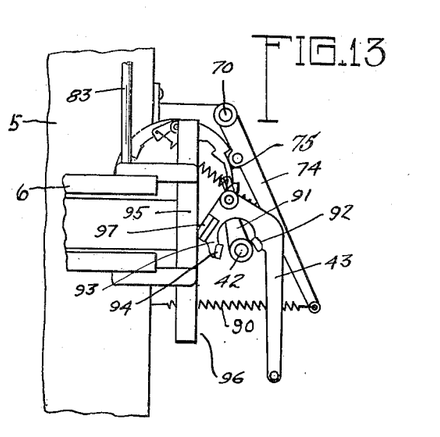
Fig. 13 is a detached view in front elevation of the lever 43 and parts appurtenant thereto.

The lever 43 is indirectly connected with the rod 42 by means of an arm 91, fixed to said rod. (Figs. 4 and 13.) Said lever is bent as shown, and provided with an abutment 92, which bears against the hub of the arm 91, and upon the lever being forced inwardly the rod 42 is rocked in a direction to disengage the clutch 39, and interrupt the movement of the cylinder 46. The lever 43 is provided with an extension 93, at the end of which is an abutment 94, also adapted for engagement with the hub of the arm 91, and upon the lever 43 being moved outwardly the rod 42 is rocked in a direction to cause the clutch 39 to engage the hub 40, and impart movement to the rotor 46. At the end of the cross-beam 6 adjacent to the lever 43 is supported a vertical bar 95, near the lower end of which is a block 96 in line with a detent 97 on the extension 93, and upon the bar 95 being carried upwardly a sufficient height, in the upward movement of the beam 6 and spindle devices, the block 96 engages the detent 97, rocking the arm 91 outwardly, and disengaging the clutch 39. The movement of the spindle mechanism is thereby interrupted, the same as when the rod 42 is operated by the lever 43. The relative positions of the block 96 and detent 97 are such that the detent is engaged by said block as the spindle mechanism approaches the end of its greatest upward movement, as shown in Fig. 9, and following the disengagement of the pin 59 from the disk 58. The movement of the devices for reciprocating the spindle mechanism is thereby stopped automatically at the end of the downward movement of the arm 60, as shown in said figure. To permit said parts to again operate the lever 43 is pulled outwardly, disengaging the detent 97, and reengaging the clutch 39.

Figure 11:
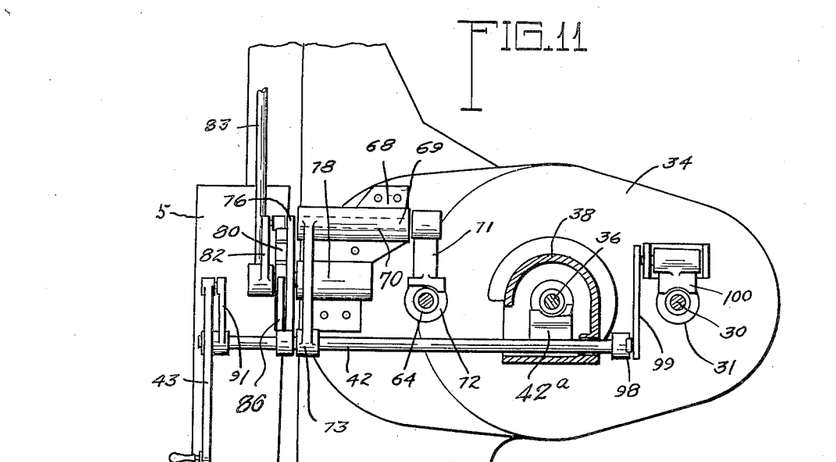
Fig. 11 is an enlarged detail of the automatic check mechanism, the lever 74 being omitted to more fully disclose the parts.

The rod 42 passes through the housing extension 38, and on the rear end thereof is fixed a crank 98, connected by an arm 99 with a shift device 100, supported in a bracket 101 attached to the housing 34, and in engagement with the collar 31 on the rod 30 (Fig. 11). Said rod is thereby actuated simultaneously with the movement of the clutch 39, to cause a rotation of the spindles 10 when the clutch is engaged, and discontinue such rotation when the clutch is disengaged.

To the sides of the frame 56 are attached arms 102, between which are supported weights 103, to assist in counterbalancing the weight of the spindle mechanism, and render the operation thereof less burdensome.

To recapitulate;—the lapping tools and mechanism for operating the same are elevated to the highest point, permitting a set of cylinders to be placed beneath the same, in postion for finishing. The machine is then started and the spindles reciprocated for the number of times arranged for by the ratchet wheel 80. If it is desired to continue the reciprocating movement for another cycle this can be done by holding the lever 74 outwardly, so that the boss thereon will not enter the recess 89. If this is not desired, the lever is permitted to operate, disconnecting the pin 62 and permitting the arm 60 to make its extreme downward stroke. This carries the spindle mechanism upwardly to a higher point, and the detent 97 is engaged, stopping the machine with the mechanism at this point. When desired, the machine is started again in the manner before mentioned. It will be understood that in the ordinary operation of the machine the cross-beam 6 will not attain to a height which will cause an engagement of the detent 97 by the block 96.

It will be evident that the machine can be adapted to other classes of work wherein a reciprocating movement is made use of besides the one set forth herein, and other changes can be made in the arrangement and operation thereof without departing from the spirit of the invention, as set forth and claimed herein.

What I claim, and desire to secure by Letters Patent, is:

1. A device of the class described, comprising a main frame and mechanism therein capable of receiving a reciprocating movement, a frame rockingly mounted and operatively connected with said reciprocating mechanism, a rotary member and means for imparting rotation thereto, a crank-disk pivoted to said rotary member, and a crank-arm pivoted at one end to said rocking frame, and having two connections with said disk, one of said connections being releasable to permit an additional movement of said crank-arm.

2. A device of the class described, comprising a main frame and mechanism therein capable of receiving a reciprocating movement, a frame rockingly mounted and operatively connected with said reciprocating mechanism, a rotary member and means for imparting rotation thereto, a crank-disk pivoted to said rotary member, a crank-arm having two connections with said disk, one of said connections being releasable to permit an additional movement of the crank-arm, and means for causing the release of said last-named connection at the end of a predetermined number of movements of said rotary member.

3. A device of the class described, comprising a main frame and mechanism carried thereby capable of receiving a reciprocating movement, a frame rockingly mounted and operatively connected with said reciprocable mechanism, a rotor in said main frame and means for giving continuous rotation thereto, a disk pivoted to said rotor, a crank-arm pivoted at one end to said rocking frame, and having two connections with said disk, one of which connections is releasable, means for causing the release of said last named connection at the end of a predetermined number of movements of said rotor, and means for interrupting the movement of said rotor at the end of a partial rotation thereafter.

4. In a device of the class described, a rotary member, a crank-disk pivoted thereto and provided at one side of its face with a crank-pin and at the opposite side with catch engaging means, a crank-arm connected with said pin and provided with a catch for releasable engagement with said catch engaging means, and means for disconnecting said catch at the end of a predetermined number of movements of said rotary member.

5. In a device of the class described, a rotary member, a crank-disk pivoted thereto and provided at one side of its face with a crank-pin and at the opposite side with an opening, a crank-arm pivoted to said pin and provided with a projecting end, a spring-actuated pin in said projecting end adapted for engagement with the opening in said disk, and a displacement member adapted to enter said opening at the end of a predetermined number of movements of said rotary member and force said pin therefrom, and held in said opening during a continued partial revolution of said rotary member.

6. In a device of the class described, a main frame and mechanism therein capable of receiving a reciprocating movement, a frame rockingly mounted and operatively connected with said reciprocable mechanism, a rotor in said main frame and means for imparting rotation thereto, a crank-disk pivoted to said rotor, a crank-arm having two connections with said crank-disk, one of said connections being releasable, a releasing device therefor, and controlling mechanism for operating said releasing device at the end of a predetermined number of movements of said rotor.

7. A device of the class described, comprising a main frame and mechanism carried thereby so as to be capable of a reciprocating movement, a rotor in said frame and means for imparting movement thereto, a crank-disk pivoted to said rotor, a crank-arm operatively connected with said mechanism and having two connections with said crank-disk, one of which is releasable, the release thereof permitting an added movement of the crank-arm, a release member and lever mechanism for actuating the same, a step-by-step mechanism provided with means for actuating said lever mechanism at the end of a predetermined number of movements of said step-by-step mechanism, and means for imparting a movement to said step-by-step mechanism coincidently with each up and down movement of said reciprocable mechanism.

8. A device of the class described, comprising a main frame and mechanism carried thereby so as to be capable of a reciprocating movement, a rotor in said frame and means for operating the same, a crank-disk pivoted to said rotor, a crank-arm operatively connected with said reciprocable mechanism, and having a pivotal connection with said crank-disk and an additional releasable connection therewith holding said disk and arm normally in position to cause a prescribed movement of the crank-arm, the release of said connection permitting an additional movement to said crank-arm, a releasing device for said connection, and lever mechanism for actuating the same, a step-by-step mechanism provided with means for actuating said lever mechanism at the end of a predetermined movement of said step-by-step mechanism, means for imparting a movement to said step-by-step mechanism coincidently with each full movement of said reciprocable mechanism, and means for interrupting the movement of said rotor at a predetermined point following the operation of said lever mechanism.

9. A device of the class described, comprising a main frame and frame supported thereby so as to be vertically reciprocable, spindle devices in said last-named frame, a main drive shaft journalled in the main frame, a rotor in the main frame and means for operating the same, normally inactive, a crank-disk pivoted on said rotor and crank-arm therefor operatively connected with said reciprocable frame, said crank-arm having two connections with said disk, one of which is releasable to permit a variation in the movement of said crank-arm, means for releasing one of said connections at the end of a predetermined number of movements of said rotor, spindle driving mechanism and clutch devices for connecting the same with said main drive shaft, clutch devices for connecting said main drive shaft with said rotor operating mechanism, and shift mechanism connected with both of said clutch devices, adapted to operate the same to coincidently rotate said rotor and rotate said spindle devices.

10. A device of the class described, comprising a main frame and mechanism carried thereby capable of a reciprocating movement, a rotor in said frame and means for operating the same, a crank-disk pivoted to said rotor, a crank-arm operatively connected with said reciprocable mechanism and having a pivotal connection with said crank-disk and an additional releasable connection permitting a variation in the movement of said crank-arm, a releasing device for said mechanism, releasing the same and locking the rotor and crank-disk together at the same time, and means for controlling said releasing device so that it will operate at the end of a prescribed number or rotations of the rotor.

In testimony whereof I affix my signature.

WILSON P. HUNT.